(No Model.)
B. C. POLE.
CAR STARTER.
No. 365,274. Patented June 21, 1887.
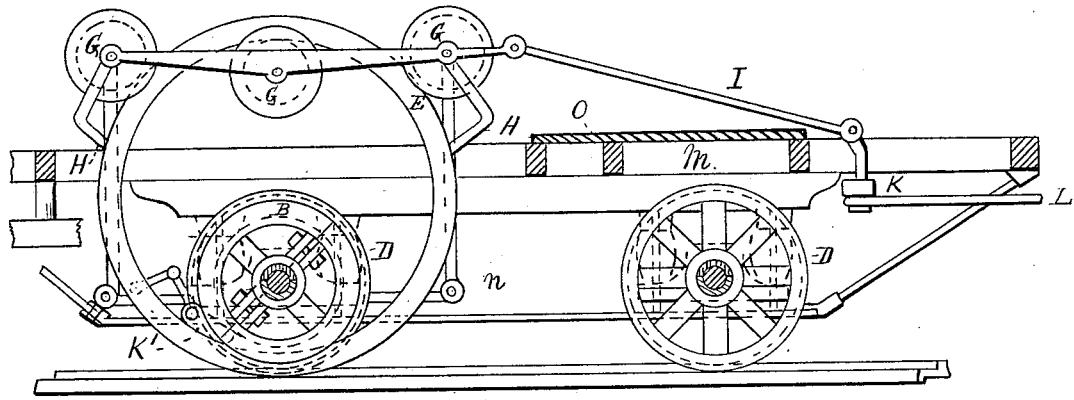
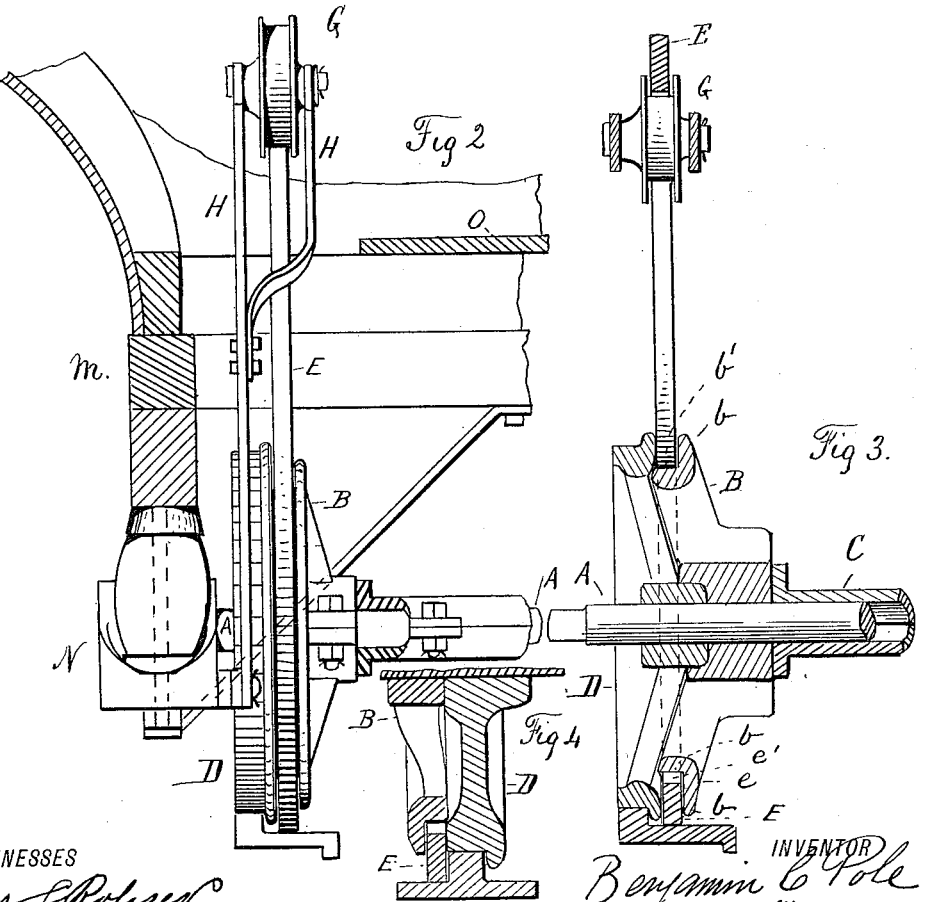
WITNESSES
Harry J. Roliser
Emma M. Gillett
INVENTOR
Benjamin C. Pole

UNITED STATES PATENT OFFICE.

BENJAMIN C. POLE, OF CAMDEN, NEW JERSEY.

CAR-STARTER.

SPECIFICATION forming part of Letters Patent No. 365,274, dated June 21, 1887.

Application filed June 10, 1886. Serial No. 204,801. (No model.)

*To all whom it may concern:*

Be it known that I, BENJAMIN C. POLE, a citizen of the United States, residing at Camden, in the county of Camden, State of New Jersey, have invented certain new and useful Improvements in Car-Starters, of which the following is a specification, reference being had therein to the accompanying drawings.

My invention relates to car-starters and devices for operating them, being an improvement on Letters Patent of February 15, 1881, No. 237,697; and the nature of this invention consists in certain constructions of the various parts for the purpose of improvement to said patent and for the purpose of preventing the undue wear of parts, by which the load designed to be moved by the starter shall only be raised in the operation of starting, and not carried continuously by the ring or wheels, all of which is more fully set forth in the annexed specification and claims.

Referring to the drawings accompanying this application, and forming part thereof, Figure 1 is a sectional side elevation of my invention, showing the same in connection with the wheels of a car. Fig. 2 is a cross-section of Fig. 1. Fig. 3 is a cross section of the car-wheel, showing the differential ring, also in section. Fig. 4 is a modification of Fig. 3, wherein the ring is on the outside when a city passenger-rail is used of T formation.

Referring to the drawings, upon the ordinary car-wheel axle, A, is placed a split wheel, B, which is free to revolve on the axle A. Between the wheel B and a similar wheel on the other side of the axle is a simple divided sleeve, C, bolted on the axle A, which is for the purpose of keeping them apart and in their position close to the ordinary car-wheel, D. This construction allows the split wheel B to freely revolve, and the sleeve C holds in place wheel B, which would be otherwise forced in on the axle A when a side thrust came, like rounding a curve or turning a switch. The ring E is placed around the wheel B and comes up in the groove at $e$. A space, $e'$, permits the ring E to be free in its upward movement while rolling, but is confined in position laterally by the flange $b$ of the wheel B. At the top of the ring E is the operating friction-wheel G, through which the strain of the moving power—horses or motor—is transmitted to the periphery of the ring E, and this ring E, moving forward, rolls up against the face $b$ of the wheel E and acts as a lever for starting the car, taking off so much weight as is required for the traction of the car. The wheel B, freely revolving on the axle A, comes to a stop when the ring-wheel E presses against it, notwithstanding the ring E and the wheel D may be in motion, and at each impulse acts at once for the height of the leverage as a lever in traction, while not at all times sustaining the weight of the load and vehicle.

The prompter or wedge K' is inserted between the free wheels B and the ring E, and is of a form conforming to the inside radius of the ring E for its outer shape and the curve of the outside radius of the part $e'$ of the wheel B for its inner or upward shape. It may be of other shape. This prompter is more fully set forth in another application of mine, wherein it is claimed with wheels resting one within the other. Here it is in connection with a free wheel on the axle and an ordinary car-wheel carrying the load, the prompter or wedge acting when the ring E, which is on the track, is operated by the operating-wheels G. The free wheel B, held in the position, as set forth, on the axle A, and forced or held out against wheels D by sleeve C, makes two freely-running or loose wheels on axle A, and these wheels inside of two fixed wheels D on the same axle—four wheels in all—and in the event of turning switches and curves where there is a central or inner riser provided, the free wheels B will take the weight off of the wheels D, and in this manner the advantages of free wheels will be derived at the curves and switches and place where the risers are provided to make a contact with the wheel B, making easy curving, and should wheels be thus added for curving and turning switches only, and not using the remainder of the starting devices, then the groove $e$ may be dispensed with and the flange $b$ fill up the therein-described groove-space.

The pedestal, as shown in Fig. 11 of the Letters Patent before quoted, carries the guide-rods H, which hold up the friction-wheels G and the connecting-rod I to the singletree K, to the draw-rod L, which is connected to the moving power.

The frame of the ordinary car is denoted by the letter M, and pedestal and its box by the letter N; the floor of the car by the letter O. The prompter K' will be inserted between the ring E.

Having thus described my invention, what I claim, and desire to secure by Letters Patent, is—

1. In a car-starter, the ordinary car-wheel, D, provided with the free wheel B, ring E, and operating-wheel G, substantially as and for the purpose set forth.

2. In a car-starter, the wheel D, provided with wheel B, ring E, operating-wheel G, and prompting device or wedge K', substantially as and for the purpose set forth.

3. In a car-starter, a car-axle provided with ordinary fixed car-wheels, D, the additional free wheels, B, and sleeve C, substantially as specified.

4. In a car-starter provided with a friction-wheel for operating a wheel or ring-wheel resting upon the track, as shown, the links H, connected to the pedestal N, substantially as and for the purpose set forth.

5. In a car-starter, the pedestal N, provided with a cross-brace, $n$, link H, operating-wheels G, draw-bar I, whiffletree K, and draw-bar L, substantially as and for the purpose set forth.

In testimony whereof I affix my signature in presence of two witnesses.

BENJAMIN C. POLE.

Witnesses:
 HARRY S. ROHRER,
 EMMA M. GILLETT.